United States Patent
Maurer et al.

(10) Patent No.: US 8,092,727 B2
(45) Date of Patent: Jan. 10, 2012

(54) METHOD OF FORMING EXTRUDED POLYSTYRENE FOAMS AND THE PRODUCTS MADE THEREFROM

(75) Inventors: Myron J. Maurer, Saginaw, MI (US); Alain Michel Andre Sagnard, Drusenheim (FR); Dominicus L. Bindels, Sittard (NL); Michelle L. Boven, Midland, MI (US); Byoung-Ho Choi, Uijeongbu-Si (KR); Robert J. Cleereman, Midland, MI (US); Ryan S. Gaston, Midland, MI (US); Joseph A. Langmaid, Caro, MI (US); Curtis Alan Browning, Saginaw, MI (US)

(73) Assignee: Dow Global Technologies LLC, Midland, MI (US)

( * ) Notice: Subject to any disclaimer, the term of this patent is extended or adjusted under 35 U.S.C. 154(b) by 283 days.

(21) Appl. No.: 12/198,322

(22) Filed: Aug. 26, 2008

(65) Prior Publication Data
US 2009/0062410 A1 Mar. 5, 2009

Related U.S. Application Data

(60) Provisional application No. 60/966,285, filed on Aug. 27, 2007.

(51) Int. Cl.
*B29C 53/72* (2006.01)
*B29C 41/52* (2006.01)
*C08J 9/00* (2006.01)

(52) U.S. Cl. ... 264/46.1; 521/146; 521/137; 296/187.03

(58) Field of Classification Search ............... 521/146, 521/137; 52/518; 264/46.1; 296/187.03
See application file for complete search history.

(56) References Cited

U.S. PATENT DOCUMENTS

| | | | |
|---|---|---|---|
| 2,795,008 | A | 6/1957 | Lindemann et al. |
| 2,988,835 | A | 6/1961 | Murphy et al. |
| 3,231,524 | A | 1/1966 | Simpson |
| 3,334,169 | A | 8/1967 | Erceg et al. |
| 3,446,406 | A | 5/1969 | Koch |
| 4,304,810 | A | 12/1981 | Gates et al. |
| 4,420,448 | A | 12/1983 | Krutchen |
| 4,510,268 | A | 4/1985 | Tonokawa et al. |
| 4,730,761 | A | 3/1988 | Spano |
| 4,856,393 | A | 8/1989 | Braddon |
| 4,863,791 | A | 9/1989 | Steward et al. |
| 5,050,323 | A | 9/1991 | Gagnon |
| 5,114,656 | A | 5/1992 | Dionne |
| 5,193,925 | A | 3/1993 | Foulke |
| 5,225,254 | A | 7/1993 | Foulke |
| 5,340,844 | A | 8/1994 | Welsh et al. |
| 5,520,873 | A | 5/1996 | Liene |
| 5,622,587 | A | 4/1997 | Barthelman |
| 5,718,968 | A | 2/1998 | Cutler et al. |
| 5,735,453 | A | 4/1998 | Gick et al. |
| 5,736,075 | A | 4/1998 | Lee et al. |

(Continued)

FOREIGN PATENT DOCUMENTS

DE 19542717 3/1997

(Continued)

*Primary Examiner* — Randy Gulakowski
*Assistant Examiner* — Kara Negrelli (57) ABSTRACT

The invention a method of forming complex shape of styrenic polymer foams in which a pressing surface is created, for example, by planing/machining a layer of an as formed extruded styrenic polymer plank, contacting said plank with a contoured die face and pressing the foam to form the complex shape.

35 Claims, 6 Drawing Sheets

U.S. PATENT DOCUMENTS

| | | | |
|---|---|---|---|
| 6,062,624 A | 5/2000 | Crabtree et al. | |
| 6,129,969 A | 10/2000 | Pynenburg et al. | |
| 6,520,900 B1 | 2/2003 | Sanford | |
| 6,586,074 B1 | 7/2003 | Lee et al. | |
| 6,626,965 B2 | 9/2003 | Workman et al. | |
| 7,585,557 B2 * | 9/2009 | Aylward et al. | 428/195.1 |
| 2004/0001945 A1 | 1/2004 | Cate et al. | |
| 2004/0255741 A1 | 12/2004 | Deng et al. | |
| 2006/0148919 A1 * | 7/2006 | Maurer et al. | 521/137 |
| 2006/0152037 A1 | 7/2006 | Dry et al. | |
| 2007/0158976 A1 * | 7/2007 | Vo et al. | 296/187.03 |
| 2008/0200572 A1 | 8/2008 | Movilli et al. | |

FOREIGN PATENT DOCUMENTS

| | | | |
|---|---|---|---|
| GB | 834956 | | 5/1960 |
| JP | 6218860 | | 8/1994 |
| JP | 10250205 | | 9/1998 |
| JP | 10250205 A | * | 9/1998 |
| WO | 03061938 | | 7/2003 |
| WO | WO 03-061938 | * | 7/2003 |

* cited by examiner

Figure 9 too long herein, is merely used for convenience with the understanding that other shapes than a flat board having a rectangular cross-section may be extruded.

Any suitable method of extruding to form the foam plank may be used such as mixing the styrenic polymer and blowing agent and extruding by a method known in the art. For example, a method for extruding styrenic foams such as described in U.S. Pat. Nos. 3,231,524; 3,482,006, 4,420,448 and 5,340,844 may be used.

As per convention, but not limited by, the extrusion of the plank is taken to be horizontally extruded (the direction of extrusion is orthogonal to the direction of gravity). Using such convention, the plank's top surface is that farthest from the ground and the plank's bottom surface is that closest to the ground, with the height of the foam (thickness) being orthogonal to the ground when being extruded.

In making the foam by extrusion, a blowing agent is used. The blowing agent may be any suitable blowing agent, such as a volatile aliphatic hydrocarbon, chlorinated hydrocarbon, fluorinated hydrocarbon, chlorofluorinated hydrocarbon, gas present in the atmosphere (oxygen, nitrogen, carbon dioxide, hydrogen, helium and the like) or combination thereof.

Examples of a volatile hydrocarbon include ethane, ethylene, propane, propylene, butane, butylenes, isobutene, pentane, cyclopentane, isopentane, hexane, heptane, or mixture thereof. Examples of chlorinated hydrocarbons, fluorinated hydrocarbons and chlorofluorinated hydrocarbons include methyl chloride, Dichlorodifluoromethane, Octafluorocyclobutane, Chlorodifluoromethane, 1,2-Dichlorotetrafluoroethane, 1,1-Dichlorotetrafluoroethane, Pentafluoroethane, 2-Chloro-1,1-difluoroethane, 2-Chloro-1,1,1-trifluoroethane, 1,1,1,2-Tetrafluoroethane, 1,1,1-Trifluoroethane, 1,1,1-Trifluoropropane, Trichlorotrifluoroethane, Difluoromethane, 2-Chloro-1,1,1,2-tetrafluoroethane, 2,2-Difluoropropane, Ethyl chloride or a mixture thereof.

Illustratively, styrenic polymer foams typically have employed chlorofluoro hydrocarbons as the gas blowing agent. These have tended, because of their slow diffusion rate, to form closed cell foams where the average gas pressure is greater than 1 atmosphere even after the foam has been aged for a long period of time. When the foam is closed or has substantial closed cells (i.e., generally greater than about 25% by number of the cells) it is preferred that at least one blowing agent or one component of the mixture of blowing agents has a substantially faster diffusion rate through the foam than air to facilitate the formation of a foam having a gas pressure of 1 atmosphere or less after aging the foam, for example, for a day or more. Substantially faster in this context means that the diffusion rate of the blowing agent is at least about 2 times faster than the diffusion rate of air. Diffusion of air is taken as the average diffusion rate of oxygen and nitrogen weighted by the presence of each in air. Preferably, the diffusion rate of the blowing agent is at least about 3 times, more preferably at least 4 times, even more preferably at least 5 times and most preferably at least 10 times faster than the diffusion rate of air.

Because, of environmental concerns, the blowing agent desirably is or is comprised of carbon dioxide, water or both.

To facilitate the shape retention and appearance after pressing, particularly of closed cell foams, the average gas pressure of the closed cells generally should be at most about 1.4 atmospheres. It is desirable that the gas pressure of the cells is less than atmospheric pressure to minimize the potential for spring back of the foam after pressing causing a less than desirable shape retention, for example, squeaking or dislodging of the foam from the structural member. Preferably, the average gas pressure of the closed cells is at most about 1.0 atmosphere, more preferably at most about 0.95, and even more preferably at most about 0.9 atmosphere and most preferably less than about 0.8 atmosphere.

The average gas pressure of the closed cells may be, using gas diffusion rates, calculated by estimating the gas content in a cellular material at differing times if the initial time that the foam is made is known (e.g., ASTM D7132-05). However, because the initial time of the foam is not always known, the cell pressure may be determined empirically as described in co-pending U.S. patent application Ser. No. 11/391,804 (page 15 of the application as filed).

The styrenic polymer is understood to mean a synthetic organic polymer of a styrenic monomer or styrenic monomer and a comonomer that is not a styrenic monomer. Styrenic monomer means a styrene monomer, derivative of a styrene monomer (e.g., a substituted styrene) or combination thereof. Examples of substituted styrenes are o-methylstyrene, m-methylstyrene, p-methylstyrene, 2,4-dimethylstyrene, 2,5-dimethylstyrene, p-tert-butylstyrene, p-chlorostyrene. Preferably, the styrenic polymer is polystyrene.

A copolymer of a styrenic monomer (styrene and derivative of a styrene monomer) described above and a comonomer that is not a styrenic monomer, which is also referred to herein as a "polystyrenic copolymer". Exemplary comonomers include acrylonitrile, poly(2,6-dimethyl-1,4-phenylene ether), methyl acrylate, butyl acrylate, methacrylonitrile, maleimide, acrylic acid, methacrylic acid, maleic anhydride, itaconic anhydride or combination thereof. The comonomer is preferably acrylonitrile, maleic anhydride or combination thereof. More preferably, the comonomer is acrylonitrile.

Generally, the amount of styrenic monomer in the polystyrenic copolymer is at least about 50% by mole of the copolymer. Typically, the amount of comonomer is about 1% to 50% by mole of the polystyrenic copolymer. Preferably the amount of comonomer is at least 5%, more preferably at least about 10%, even more preferably at least about 20% and most preferably at least about 25% by mole of the polystyrenic copolymer.

A preferred polystyrenic copolymer is a styrene-acrylonitrile copolymer (SAN). The SAN copolymer may have 1% to 50% by weight of acrylonitrile. Preferably, the acrylonitrile is present in an amount of at least about 5%, more preferably at least 10%, and most preferably at least about 15% to preferably at most 45%, more preferably at most about 40% and most preferably at most about 35% by weight of the SAN copolymer.

The styrenic polymer may be of any useful weight average molecular weight (MW). Illustratively, the MW of a polystyrenic or polystyrenic copolymer may be from 10,000 to 1,000,000. The polymer may be of any useful weight average molecular weight (MW). Illustratively, the MW of the styrenic polymer may be from 10,000 to 1,000,000. The MW of a styrenic polymer is desirably less than about 200,000, which surprisingly aids in forming a shaped foam part retaining excellent surface finish and dimensional control. In ascending further preference, the MW of a polystyrenic or polystyrenic copolymer is less than about 190,000, 180,000, 175,000, 170,000, 165,000, 160,000, 155,000, 150,000, 145,000, 140,000, 135,000, 130,000, 125,000, 120,000, 115,000, 110,000, 105,000, 100,000, 95,000, and 90,000. For clarity, molecular weight (MW) herein is reported as weight average molecular weight unless explicitly stated otherwise. The MW may be determined by any suitable method such as those known in the art.

In addition the styrenic polymer may also contain other additives such as those commonly used in extruded polystyrenic foams. Examples of other additives include small amounts of cross-linking agents (e.g., divinyl benzene), colorants, UV-protectants, antioxidants, fillers, flame retardants, stabilizers, for example of the flame retardants, antistats, cell nucleation control agents and the like.

The styrenic polymer after extruding is a foam, that is, it is cellular. Cellular (foam) has the meaning commonly understood in the art in which a polymer has a substantially lowered apparent density comprised of cells that are closed or open. Closed cell means that the gas within that cell is isolated from another cell by the polymer walls forming the cell. Open cell means that the gas in that cell is not so restricted and is able to flow without passing through any polymer cell walls to the atmosphere.

The foam may have any amount of open or closed cells. Even so, for some applications a portion of the cells may be advantageously closed, for example, when absorption of water is deleterious to the function of the final product. Even though open or closed foams may be used, when the application desired benefits from lack of water absorption, the foam is preferably closed cell. For such applications, it is preferred, that at least about 55%, more preferably at least about 60%, even more preferably at least about 75% and most preferably at least about 90% of the cells of the foam are closed cells.

Generally, the foam may have a density from about 16 kg/m$^3$ to about 100 kg/m$^3$ or more. The foam density, typically, is selected depending on the particular application, for example, for an exterior building façade panel, the density is typically is at least about 24 kg/m$^3$ to about 64 kg/m$^3$.

The cells of the foam may have an average size (largest dimension) of from about 0.05 to about 5.0 mm, especially from about 0.1 to about 3.0 mm, as measured by ASTM D-3576-98. Foams having larger average cell sizes, of especially about 1.0 to about 3.0 mm or about 1.0 to about 2.0 mm in the largest dimension, are of particular use when the foam fails to have a compressive ratio of at least 0.4 as described in the following few paragraphs.

The forming of the complex foam shapes are surprisingly enhanced by having foams that have at least one direction where at least one of $C_E/C_T$, $C_V/C_T$ and $C_H/C_T$ is at least 0.4 said one of $C_E/C_T$, $C_V/C_T$ and $C_H/C_T$ (compressive ratio), $C_E$, $C_V$ and $C_H$ being the compressive strength of the cellular polymer in each of three orthogonal directions E, V and H where one of these directions is the direction of maximum compressive strength in the foam and $C_T$ equals the sum of $C_E$, $C_V$ and $C_H$.

The compressive strength is established when the compressive strength of the foam is evaluated in three orthogonal directions, E, V and H, where E is the direction of extrusion, V is the direction of vertical expansion after it exits the extrusion die and H is the direction of horizontal expansion of the foam after it exits the extrusion die. These measured compressive strengths, $C_E$, $C_V$ and $C_H$, respectively, are related to the sum of these compressive strengths, $C_T$, such that at least one of $C_E/C_T$, $C_V/C_T$ and $C_H/C_T$, has a value of at least 0.40, preferably at least two have a value of at least 0.4 and most preferably. Preferably, at least one value is at least 0.45. When using such a foam, the pressing direction is desirably parallel to the maximum value in the foam.

After the foam plank is formed, the first aspect's method requires creating a pressing surface, by removing a layer from the top or bottom surface or cutting the foam plank between the top and bottom surface to create two pressing surfaces opposite the top and bottom surface. Examples of methods that may be useful are cutting using equipment such as band saws, computer numeric controlled (CNC) abrasive wire cutting machines, CNC hot wire cutting equipment and the like. When removing a layer, the same cutting methods just described may be used and other methods such as planing, grinding or sanding may be used.

Typically, after the removing or cutting, the plank is at least about several millimeters thick to at most about a 60 centimeters thick. Generally, when removing a layer, the amount of material is at least about a millimeter and may be any amount useful to perform the method such as 1.2, 1.4, 1.6, 1.8, 2, 2.5, 3, 3.5, 4, 5 millimeters or any subsequent amount determined to be useful such as an amount to remove any skin that is formed as a result of extruding the styrenic polymer foam, but is typically no more than 10 millimeters. In another embodiment, the foam is cut and a layer is removed from the top or bottom surface opposite the cut surface to form two pressing surfaces.

In a particular embodiment, the foam plank having a pressing surface, has a density gradient from the pressing surface to the opposite surface of the foam plank. Generally, it is desirable to have a density gradient of at least 5%, 10%, 15%, 25%, 30% or even 35% from the pressing surface to the opposing surface of the foam plank. To illustrate the density gradient, if the density of the foam at the surface (i.e., within a millimeter or two of the surface) is 3.0 pounds per cubic foot (pcf), the density would be for a 10% gradient either 2.7 or 3.3 pcf at the center of the foam. Even though the density of the foam at the pressing surface may be less or greater than the density at the center of the foam, the density of the foam at the pressing surface is preferably less than the density at the center of said foam plank. Likewise, if the foam plank has two pressing surfaces, both desirably have the aforementioned density gradient.

The plank prior to contacting with a forming tool may be cut to fit into a tool, or may be cut simultaneously, such as in die cutting where the die cutting apparatus is set up such that during the cutting, the shape is simultaneously pressed into the pressing surface. Lastly, the final shape maybe cut from the pressed part, for example, the foam plank may be roll pressed to form the shape into the pressing surface and subsequently cut. When cutting the foam, any suitable method may be used, such as those known in the art and those described previously for cutting the foam to form the pressing surfaces. In addition, methods that involve heat may also be used to cut the foam since the pressed shape has already been formed in the pressing surface.

The pressing surface(s) of the plank is contacted with a forming tool such as a die face. Herein die face means any tool having an impressed shape that when pressed into the foam plank will cause the foam to take the shape of the die face. That is, the material making up the die face is such that it does not deform when pressed against the foam plank, but the foam plank deforms to form and retain the desired shape of the die face.

Figure 1:
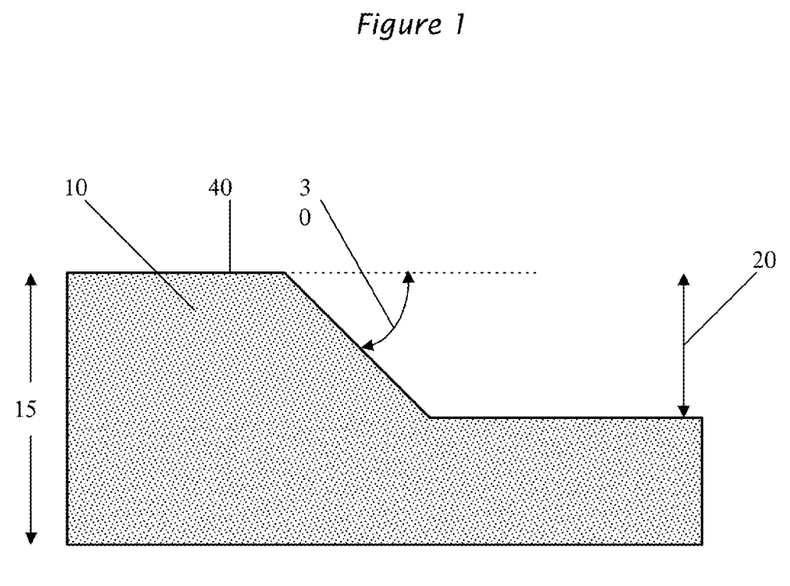

Typically when pressing, at least a portion of the foam is pressed such that the foam is compressed to a thickness of 95% or less of the to be pressed foam thickness 15 as shown in FIG. 1, which typically corresponds to just exceeding the yield stress of the foam. Likewise, when pressing the part, the maximum deformation of the foam (elastically deforming the foam) is typically no more than about 20% of the original thickness 15 of the foam ready to be pressed.

The forming tool such as a die face, because a shape is most often desired, typically has contours that create an impression (step change) in height 30 of at least a millimeter in the foam 10 having thickness 15 as shown in FIG. 1. The height/depth 30 of an impression may be measured using any suitable technique such as contact measurement techniques (e.g., coordinate measuring machines, dial gauges, contour templates) and non-contact techniques such as optical methods including laser methods. The height of the step change 30 may be greater than 1 millimeter such as 1.5, 2, 2.5, 3, 3.5, 4, 5, 6, 7, 8, 9 and 10 to a height that is to a point where there are no more foam cells to collapse such that pressing further starts to elastically deform the plastic (polymer) of the foam.

The step change, surprisingly, may be formed where the foam undergoes shear. For example, the foam may have a shear angle 20 of about 45° to about 90° from the press surface 40 of the foam 10 in a step change 30. It is understood that the shear angle may not be linear, but may have some curvature, with the angle in these cases being an average over the curvature. The angle surprisingly may be greater than 60°, 75° or even by 90° while still maintaining an excellent finish and appearance.

In another aspect of the invention, a styrenic foam having a higher concentration of open cells at a surface of the foam than the concentration of open cells within the foam is contacted and pressed to form the shape. In this aspect of the invention the foam may be any styrenic foam such as the extruded styrenic polymer foam described above. It may also be any other styrenic polymeric foam such as those known in the art including, for example, where the blowing agent is added to polymer beads, typically under pressure, as described by U.S. Pat. No. 4,485,193 and each of the U.S. patents this patent cites at col. 3, lines 6-13.

With respect to this open cell gradient, the gradient is as described above for the density gradient where the concentration of open cells if determined microscopically and is the number of open cells per total cells at the surface.

Generally, the amount of open cells in this aspect of the invention at the surface is at least 5% to completely open cell. Desirably, the open cells at the surface is at least in ascending order of 6%, 7%, 8%, 10%, 20%, 30%, 40%, 50%, 60%, 70%, 80%, 90% and completely open cell at the surface.

The foam may have the open cells formed at the surface by mechanical means such as those described above (e.g., planing/machining or cutting) or may be induced chemically, for example, by use of suitable surfactants to burst closed cells at the surface.

The foam surface with the higher concentration of open cells is contacted with a die face and pressed as described above. In a preferred embodiment for such foams, the die faces are heated, but the foam is not (ambient 15-30° C.) and the foam is pressed. Surprisingly, the heated die faces being heated results in superior surface contour and appearance, whereas when doing the same with a foam without such open cells at the surface, the appearance of the foam is degraded.

When pressing with a heated forming tool such as a die face, the contact time with the foam is typically from about 0.1 second to about 60 seconds. Preferably, the dwell time is at least about 1 second to at most about 45 seconds.

When pressing with a heated forming tool such as a die face, the temperature of the die face is not so hot or held for too long a time such that the foam is degraded. Typically, the temperature of the die face is about 50° C. to about 200° C. Preferably, the temperature is at least about 60°, more preferably at least about 70° C., even more preferably at least about 80° C. and most preferably at least about 90° C. to preferably at most about 190°, more preferably at most about 180°, even more preferably at most about 170° C. and most preferably at most about 160° C.

Test Methods

The density profile through the thickness of each foam blank was tested using a QMS Density Profiler, model QDP-01X, from Quintek Measurement Systems, Inc. Knoxville, Tenn. The High Voltage kV Control was set to 90%, the High Voltage Current Control was set to 23% and the Detector Voltage was approximately 8 v. Data points were collected every 0.06 mm throughout the thickness of the foam. Approximate thickness of the foam samples in the plane of the x-ray path was 2 inches. Mass absorption coefficients were calculated for each sample individually, based on the measured linear density of the foam part being tested. The skin density, $\rho_{skin}$, was reported as a maximum value whereas the core density, $\rho_{core}$, was averaged within an approximate 5 mm range. The density gradient, in units of percentage, was then computed in accordance with the following equation:

$$\text{Density Gradient } (\%) = 100 \cdot \frac{(\rho_{core} - \rho_{skin})}{\rho_{skin}}$$

The compressive response of each material was measured using a Materials Test System equipped with a 5.0 displacement card and a 4,000 lbf load card. Cubical samples measuring the approximate thickness of each plank were compressed at a compressive strain rate of $0.065 \text{ s}^{-1}$. Thus, the crosshead velocity of the MTS, in units of inches per minute, was programmed in accordance with the following equation:

Crosshead Velocity=Strain Rate*Thickness*60 where the thickness of the foam specimen is measured in units of inches. The compressive strength of each foam specimen is calculated in accordance with ASTM D1621 while the total compressive strength, $C_{ST}$, is computed as follows:

$C_{ST}=C_{SV}+C_{SE}+C_{SH}$ where $C_{SV}$, $C_{SE}$ and $C_{SH}$ correspond to the compressive strength in the vertical, extrusion and horizontal direction respectively. Thus, the compressive balance, R, in each direction can be computed as shown below:

$R_V=C_{SV}/C_{ST}$ $R_E=C_{SE}/C_{ST}$ $R_H=C_{SH}/C_{ST}$

Open cell content was measured by using an Archimedes method on 25 mm×25 mm×50 mm samples.

EXAMPLES

Forming Procedure Examples 1-5 & Comp. Ex 1

Figure 2:
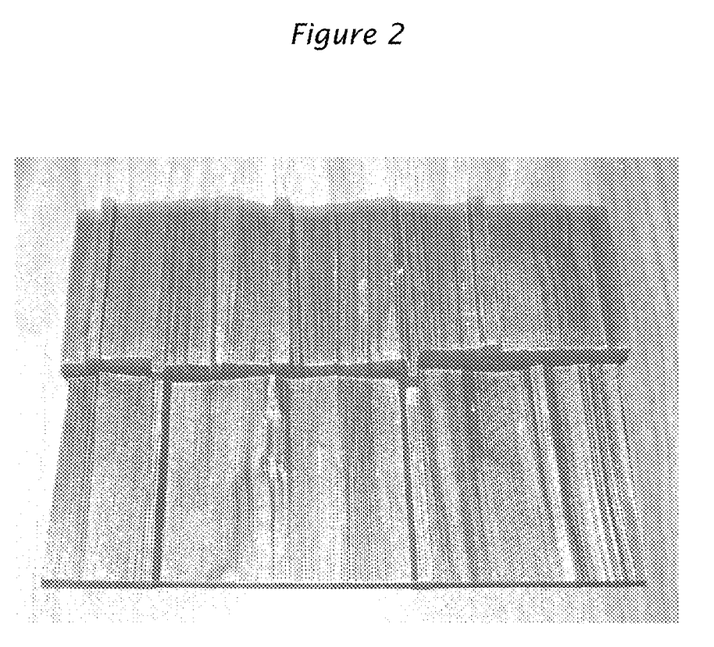

The foam specimens of each Example 1-5 and Comparative Example 1 were formed against the surface of a 1.77 inch thick prototype cedar-shake aluminum casting tool shown in FIG. 2 using the following general procedure with the foam's pertinent characteristics, the surface temperature of the cedar shake tool and results shown for each in Table 1. The surface of the tool had previously been Teflon coated by Sun Coatings in Plymouth, Mich. to eliminate the foam from sticking to the surface upon heating.

Examples 1 and 4 and Comparative Example 1 used IMPAXX™ 700, available from The Dow Chemical Co., Midland, Mich. This foam is an extruded polystyrene foam with plank dimensions measuring 100×600×2200 millimeters in the vertical (i.e. thickness), horizontal (i.e. width) and extrusion (i.e. length) directions respectively. The polystyrene had a MW of about 146,000 and was blown using carbon dioxide and a minor amount (i.e. 0.35 pph) of isobutane.

Examples 3, 5 and 6 used IMPAXX™ 300, available from The Dow Chemical Co., Midland, Mich., was tested as described above with the results shown in Table 1. This foam is an extruded polystyrene foam with plank dimensions measuring 110×600×2200 millimeters in the vertical (i.e. thickness), horizontal (i.e. width) and extrusion (i.e. length) directions respectively. The polystyrene had a MW of about 146,000 and was blown using carbon dioxide.

The tool thickness was laid flat on the moving platen surface of a 15-ton Carver compression molding machine (Model No. 3893). In addition, a series of metal stop blocks approximately 2.50 inches thick were measured using Mitutoyo digital calipers (Model No. CD-8" CS) and laid on the moving platen surface to prevent the upper platen from making direct contact with the tool surface. For those parts produced with a heated tool, the platen temperature was digitally programmed and the actual surface temperature of the tool was measured using a Tegam 871A Digital Thermometer. An extruded polystyrene (XPS) foam "blank" approximately 2.0 inches thick was cut from a XPS foam plank using a Rockwell band saw (Model 14 Band Saw). The thickness of each foam plank prior to forming was measured using the digital calipers described previously. Finally, the foam blank was then double-sided taped to the surface of the stationary platen and parts were formed by bottoming the stationary platen against the stop blocks. After being pressed, the platens were opened and the part was removed from the tool and the part examined, for example, for cracks and shape retention, which is shown in Table 1.

In Tables 1 and 2, when the pressing surface is referred to as "skin", this is the surface that is pressed against the tooling of FIG. 2 and "skin" means the foam plank was used as is without planing (removing) any material from the plank surface. "Planing" means that about 5-7 mm of material was removed from the board surface by planing and this planed surface was placed against the tooling of FIG. 2. "Cut" means that the foam plank was cut in the middle of the thickness of the plank and this cut surface was placed against the tooling of FIG. 2.

Figure 3:
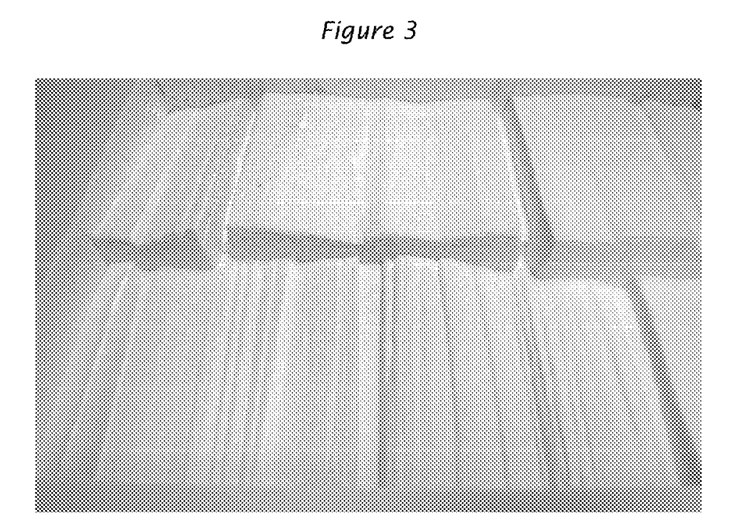
Figure 4:
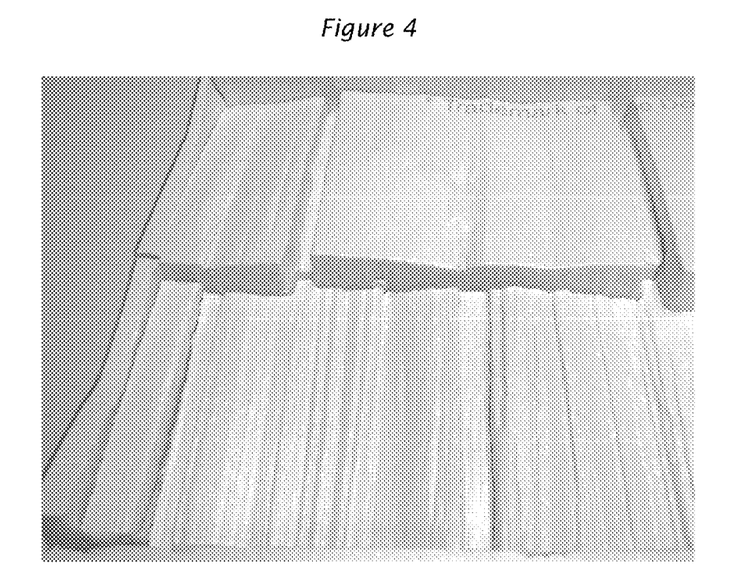

Example 1 and Comparative Example 1 are shown in FIGS. 3 and 4. The only difference in making these pressed foam parts was that for Example 1, the "cut" surface was placed against the cedar shake tool and pressed, whereas for Comp. Ex. 1 the as formed surface of the foam was placed against the cedar shake tool. Surprisingly, by doing this, the cedar shake of Example 1 has excellent shape retention and no visible surface cracks whereas Comp. Ex. 1 has multiple surface cracks and poor grain retention in the pressed foam.

Examples 2 and 3 show the desirability to have an open cell gradient where there are more open cells at the pressing surface when the tool is heated above ambient temperatures as shown by Example 2 having superior pressing results than Example 3.

Example 4 shows that for a differing foam, excellent aesthetics can be obtained when pressing against the "cut" surface. Likewise, Example 5 shows that using a "planed" surface improves the foam compared to using a "skin" surface to press against.

Forming Procedure Examples 6-9 & Comp. Ex. 2-5

Figure 7:
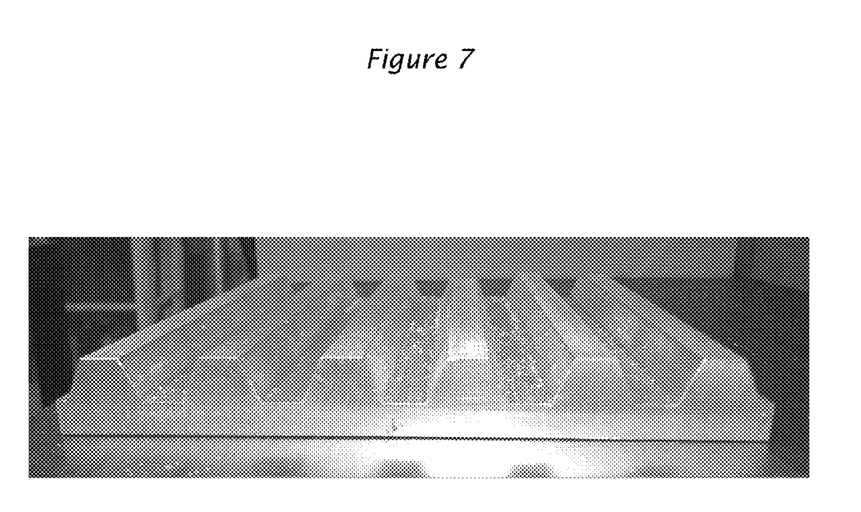

The foam specimens of each Example 6-9 and Comparative Example 2-5 were formed against the surface of a 1.01 inch thick corrugated aluminum casting tool shown in FIG. 7 using the following general procedure with the foam's pertinent characteristics, the surface temperature of the corrugated tool and results shown for each in Table 2. The surface of the tool had previously been Teflon coated by Sun Coatings in Plymouth, Mich. to eliminate the foam from sticking to the surface of a heated tool.

The tool thickness was laid flat on the moving platen surface of a 15-ton Carver compression molding machine (Model No. 3893). In addition, a series of metal stop blocks approximately 1.50 inches thick were measured using Mitutoyo digital calipers (Model No. CD-8" CS) and laid on the moving platen surface to prevent the upper platen from making direct contact with the tool surface. An extruded polystyrene (XPS) foam "blank" approximately 1.0 inches thick was cut from a XPS foam plank using a Rockwell band saw (Model 14 Band Saw). The thickness of each foam plank prior to forming was measured using the digital calipers described previously. Finally, the foam blank was then double-sided taped to the surface of the stationary platen and parts were formed by bottoming the stationary platen against the stop blocks. After pressing, the platens were opened and the part was removed from the tool.

Example 6 and Comparative Ex. 2 were formed from A 2"×48"×96" plank of R-10 STYROFOAM™ SCOREBOARD extruded polystyrene (XPS) sheathing foam, produced by The Dow Chemical Company, Midland, Mich., which was purchased from Lowe's Home Center, Inc. in Midland, Mich. (Item No. 14541). The surface of the plank contained a skin from the manufacturing process. This foam was made from a polystyrene having a MW of about 168,000 and blown using HCFC 142B (1-chloro-1,1-difluoroethane).

Example 7 and Comp. Ex. 3 were formed from STYROFOAM™ DECKMATE™ Plus brand insulation, available from The Dow Chemical Co., Midland, Mich. This foam is an extruded polystyrene foam with plank dimensions measuring 4×48×96 in. in the vertical (i.e. thickness), horizontal (i.e. width) and extrusion (i.e. length) directions respectively. The surface of the plank contained a skin from the manufacturing process. The polystyrene had a MW of about 168,000 and was blown using HCFC 142B (1-chloro-1,1-difluoroethane).

Example 8 and Comp. Ex. 4 were formed from SOLIMATE™ 400, available from The Dow Chemical Co., Midland, Mich. This foam is an extruded polystyrene foam with plank dimensions measuring 100×570×2385 millimeters in the vertical (i.e. thickness), horizontal (i.e. width) and extrusion (i.e. length) directions respectively. The surface of the plank contained a skin from the manufacturing process. The polystyrene had a MW of about 146,000 and was blown using carbon dioxide.

Example 9 and Comp. Ex. 5 were from FLOORMATE™ 500 SL-A, available from The Dow Chemical Co., Midland, Mich. This foam is an extruded polystyrene foam with plank dimensions measuring 100×600×1250 millimeters in the vertical (i.e. thickness), horizontal (i.e. width) and extrusion (i.e. length) directions respectively. The surface of the plank contained a skin from the manufacturing process. The polystyrene had a MW of about 146,000 and was blown using carbon dioxide.

Figure 8:
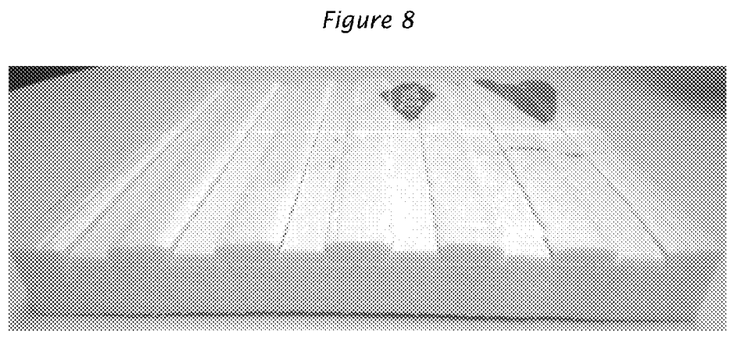
Figure 9:
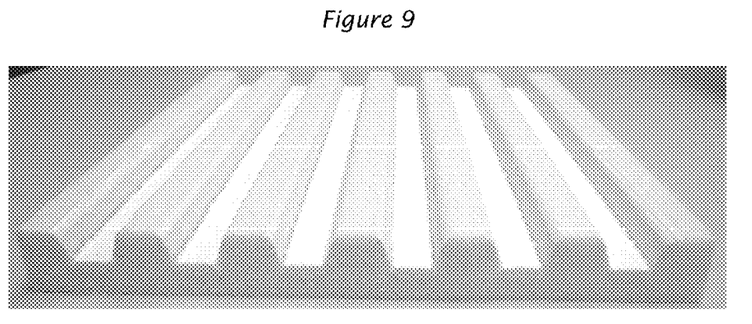

These Examples and Comp. Exs. demonstrate the method where there is severe topography introduced by the tool for multiple different foams. Every foam part was substantially improved by the method of this invention (e.g., Comp. Ex. 2 v Ex. 6 etc.). Illustratively, the difference is shown by Comp. Ex. 3 versus Example 7 in FIGS. 8 and 9 respectively.

TABLE 1

Cedar Shake Examples and Comparative Example 1.

| Example | Tool Surface T (° C.) | Pressing Surface | Rv | Average Open Cell (%) | Density (Kg/m³) | Density* Gradient (%) | Open cell gradient# | Pressing Results |
|---|---|---|---|---|---|---|---|---|
| Comp. 1 | 23 | skin | 0.62 | 2.2 | 41 | −53.3 | | Multiple surface cracks. Poor grain retention. Crack propagation beyond shear plane depth. Lack of depth between adjacent shakes. |
| 1 | 23 | cut | 0.62 | 2.2 | 41 | −53.3 | | No visible surface cracks. Excellent grain retention. No visible crack beyond shear plane. Good depth between adjacent shakes |
| 2 | 111 | cut | 0.59 | 4.9 | 36 | 18.6 | substantial | No visible surface cracks. Good grain retention. No visible crack propagation beyond shear plane. Good depth between adjacent shakes. |
| 3 | 111 | cut | 0.62 | 2.2 | 41 | −53.3 | negligible | No visible surface cracks. Swollen cedar shakes. Poor grain retention. No visible crack propagation beyond shear plane. Lack of depth between adjacent shakes. |
| 4 | 23 | cut | 0.59 | 4.9 | 36 | 18.6 | | No visible surface cracks. Exceptional grain retention. No visible crack propagation beyond shear plane. Good depth between adjacent shakes. |
| 5 | 23 | planed | 0.59 | 4.9 | 36 | 18.6 | | Few visible surface cracks. Poor grain retention. Crack propagation extending beyond shear plane depth. Lack of depth between adjacent shakes. |

Figure 5:
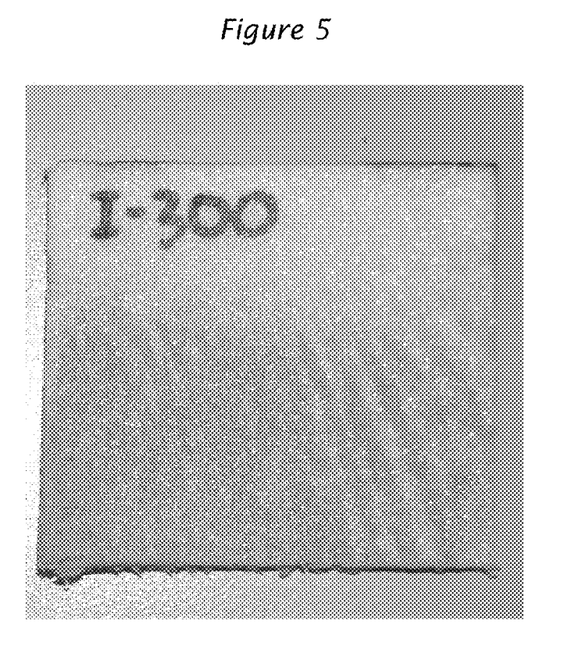
Figure 6:
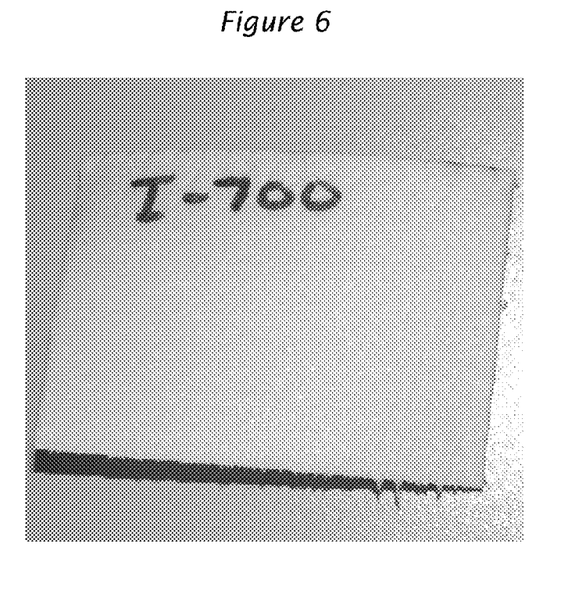

Rv is the compressive balance in the direction of the applied pressing force.
*Density Gradient is the gradient of the foam blank to be pressed.
Thin samples through the thickness of the plank were penetrated with a a soapy red dye under vacuum for about two minutes and the gradient observed visually from penetration of dye after being lightly blotted by a paper towel (see FIG. 5 for Ex. 2 and FIG. 6 for Ex. 3).

TABLE 2

Corrugated Examples and Comparative Example 1.

| Example | Tool Surface Temperature (° C.) | Pressing Surface | Rv | Average Open Cell (%) | Density (Kg/m³) | Density* Gradient (%) | Pressing Results |
|---|---|---|---|---|---|---|---|
| Comp 2 | 23 | skin | 0.33 | 3.6 | 26 | −28.4 | Little or no depth of corrugations. Jagged shear edges |
| 6 | 23 | cut | 0.33 | 3.6 | 26 | −28.4 | Some depth of corrugations. Visible cracks along shear edges |
| Comp 3 | 23 | skin | 0.48 | 3.1 | 37 | −47.2 | Poor depth of corrugations. Jagged shear edge. |
| 7 | 23 | cut | 0.48 | 3.1 | 37 | −47.2 | Good depth of corrugations. Clean Shear edges. Visible crack formation at base of part. |
| Comp 4 | 23 | skin | 0.45 | 2.9 | 34 | −18.2 | Poor depth of corrugations. Jagged shear edges. Visible crack propagation beyond base of part. |
| 8 | 23 | cut | 0.45 | 2.9 | 34 | −18.2 | Excellent depth of corrugations. Clean shear edges. No visible crack propagation beyond base of part. |
| Comp 5 | 23 | skin | 0.58 | 4.6 | 39 | −45.5 | Excellent depth of corrugations. Rounded shear edge. Crack at base of part. |
| 9 | 23 | cut | 0.58 | 4.6 | 39 | −45.5 | Excellent depth of corrugations. Clean shear edge. No visible crack propagation at base of part. |

What is claimed is:

1. A method to form a shaped foam article comprising,
  (a) extruding a styrenic polymer with a blowing agent to form a styrenic polymer foam plank, the plank having a top and bottom surface in which said surfaces lie in the plane defined by the direction of extrusion and width of the plank said plank having a vertical compressive balance equal to or greater than 0.4,
  (b) creating a pressing surface by
    (i) removing a layer of foam from (A) the top surface, (B) the bottom surface, or (C) both the top and bottom surface or
    (ii) cutting the foam plank between the top and bottom surface creating two pressing surfaces opposite the top and bottom surface,
  (c) contacting the pressing surface of the foam plank with a die face, and
  (d) pressing the foam plank such that the styrenic polymer foam is formed into a shaped foam article without heating the foam.

2. The method of claim 1, wherein at least about 1 mm of foam is removed from the top or bottom surface.

3. The method of claim 1, wherein the pressing surface is created by cutting the foam plank.

4. The method claim 3, wherein after cutting the foam, a layer of foam is removed from the top or bottom surface opposite the pressing surface to form a second pressing surface.

5. The method of claim 4, wherein during pressing a step change in height of at least 1 mm is formed in the pressing surface and the step change has a step change angle that is from about 45° to 90°.

6. The method of claim 5, wherein the step change angle is at least about 60°.

7. The method of claim 6, wherein the step change angle is at least about 75°.

8. The method of claim 7, wherein the step change angle is 90°.

9. The method of claim 1, wherein the styrenic foam plank after the pressing surface has been formed, has a density gradient from the pressing surface to the center of said foam plank of at least about 5%.

10. The method of claim 9, wherein the density gradient is at least 10%.

11. The method of claim 9, wherein the density at the pressing surface is greater than the density at the center of said plank.

12. The method of claim 9, wherein the density at the pressing surface is less than the density at the center of said plank.

13. The method of claim 9, wherein said foam plank has two pressing surfaces and the density at each of the pressing surfaces is greater than the density at the center of said plank.

14. The method of claim 9, wherein said foam plank has two pressing surfaces and the density at each of the pressing surfaces is less than the density at the center of said plank.

15. The method of claim 1 wherein the pressing is performed using die cutting.

16. The method of claim 1, wherein the claim 1, wherein the styrenic polymer foam is polystyrene.

17. The method of claim 4, wherein the styrenic polymer foam is a polymer of a styrenic monomer that is styrene, o-methylstyrene, m-methylstyrene, p-methylstyrene, 2,4-dimethylstyrene, 2,5-dimethylstyrene, p-tert-butylstyrene, p-chlorostyrene or combination thereof.

18. The method of claim 1, wherein the styrenic polymer is a copolymer of styrenic monomer and a comonomer selected from the group consisting of acrylonitrile, poly(2,6-dimethyl-1,4-phenylene ether), methyl acrylate, methacrylonitrile, maleimide, acrylic acid, methacrylic acid, maleic anhydride, itaconic anhydride and combination thereof.

19. The method of claim 18, wherein the comonomer is acrylonitrile.

20. The method of claim 19, wherein the acrylonitrile is present in amount of about 1% to about 35% by weight of the styrenic polymer.

21. The method of claim 20, wherein the acrylonitrile is present in an amount of at least about 15%.

22. The method of claim 21, wherein the acrylonitrile is present in an amount of at least about 20%.

23. The method of claim 1, wherein the extruding of the foam plank employs a blowing agent that is a volatile aliphatic hydrocarbon, carbon dioxide, water or combination thereof.

24. The method of claim 23, wherein the blowing agent is ethane, ethylene, propane, propylene, butane, butylenes, isobutene, pentane, neopentane, isopentane, hexane, heptane, carbon dioxide, water or combination thereof.

25. The method of claim 24, wherein the blowing agent is carbon dioxide, water or combination thereof.

26. The method of claim 1, wherein at least one blowing agent has a diffusion rate through the styrenic polymer foam plank that is greater than the diffusion rate of air through said styrenic polymer.

27. The method of claim 26, wherein all of the blowing agents have a diffusion rate through the styrenic polymer that is greater than the diffusion rate of air through said polymer.

28. The method of claim 1, wherein the blowing agent is carbon dioxide, water or combination thereof.

29. The method of claim 1 further comprising after the extruding to form the styrenic foam plank, the plank having at least a portion of the cells being closed, aging said plank for at least one day such that the average gas pressure of the closed cells is less than 1 atmospheres.

30. The method of claim 29, wherein the average gas pressure of the closed cells is at most about 0.95 atmosphere.

31. The method of claim 29, wherein the average gas pressure of the closed cells is at most 0.9 atmosphere.

32. The method of claim 31, wherein the average gas pressure of the closed cells is at most 0.8 atmosphere.

33. The method of claim 1 wherein the surface to be pressed has a higher concentration of open cells than the concentration of open cells within the foam.

34. A shaped foam article made by the method of claim 1.

35. The shaped foam article of claim 33 wherein the shaped foam article is an automobile energy absorbing foam, automobile sun visor, automobile head rest, automobile bumper, automobile door panel, bicycle helmet foam padding, floral and craft foam article, interior partition panel, concrete floor thermal insulation, insulation board, interior decorative cornice, exterior decorative cornice, cushion packaging article or exterior building façade panel.

* * * * *